(12) United States Patent
Dunning et al.

(10) Patent No.: US 12,049,429 B2
(45) Date of Patent: Jul. 30, 2024

(54) HONEYCOMB BODY WITH A CUTOUT PORTION AND METHOD OF MANUFACTURING SAME

(71) Applicant: CORNING INCORPORATED, Corning, NY (US)

(72) Inventors: Darryl Lynn Dunning, Elmira, NY (US); Michael James Lehman, Canisteo, NY (US); Jennifer Schlehr O'Brien, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/951,457

(22) Filed: Sep. 23, 2022

(65) Prior Publication Data

US 2023/0096552 A1    Mar. 30, 2023

Related U.S. Application Data

(60) Provisional application No. 63/248,865, filed on Sep. 27, 2021.

(51) Int. Cl.
| | |
|---|---|
| *C04B 38/00* | (2006.01) |
| *B01D 46/00* | (2022.01) |
| *B01D 46/24* | (2006.01) |
| *B01D 53/94* | (2006.01) |
| *B01J 35/56* | (2024.01) |

(Continued)

(52) U.S. Cl.
CPC ...... *C04B 38/0012* (2013.01); *B01D 46/0001* (2013.01); *B01D 46/2418* (2013.01); *B01D 53/94* (2013.01); *B01J 35/56* (2024.01); *B28B 1/48* (2013.01); *B28B 11/00* (2013.01);

(Continued)

(58) Field of Classification Search
CPC .. C04B 38/0006; C04B 38/0012; B28B 11/12
See application file for complete search history.

(56) References Cited

U.S. PATENT DOCUMENTS

| | | | | |
|---|---|---|---|---|
| 2004/0206061 | A1* | 10/2004 | Ichikawa | F01N 3/0222 55/523 |
| 2005/0210848 | A1* | 9/2005 | Kuki | B01D 46/2494 55/523 |

(Continued)

FOREIGN PATENT DOCUMENTS

JP    11-291220 A    10/1999

OTHER PUBLICATIONS

Sommier et al., "Electrical heated catalyst product and system: the answer for hybrid gasoline clean engine", SIA Powertrain & Power Electronics Congress Jun. 9-10, 2021, 9 pages.

*Primary Examiner* — Erin Snelting
(74) *Attorney, Agent, or Firm* — Kurt R. Denniston

(57) ABSTRACT

A honeycomb body having a cutout, an assembly including the honeycomb body, and a method of manufacturing. The method includes forming the honeycomb body having a matrix of intersecting walls that define a plurality of cells and channels extending longitudinally through the honeycomb body. A subset of the channels are plugged to create a plurality of plugged cells in a reinforcement region of the honeycomb body. Material is removed from the honeycomb body within the reinforcement region in accordance with a peripheral shape that passes through the plugged cells to form a cutout that extends an axial depth into the honeycomb body.

13 Claims, 5 Drawing Sheets

(51) Int. Cl.
  *B28B 1/48* (2006.01)
  *B28B 11/00* (2006.01)
  *B28B 11/12* (2006.01)
(52) U.S. Cl.
  CPC ...... *B28B 11/12* (2013.01); *B01D 2255/9155* (2013.01); *B01D 2279/30* (2013.01)

(56) References Cited

U.S. PATENT DOCUMENTS

| | | | |
|---|---|---|---|
| 2009/0140471 A1* | 6/2009 | Fletcher | C04B 41/5025 |
| | | | 264/630 |
| 2015/0091203 A1* | 4/2015 | Elliott | B28B 11/12 |
| | | | 264/162 |
| 2019/0224606 A1* | 7/2019 | Imagawa | B01D 46/2474 |
| 2021/0123369 A1 | 4/2021 | Sommier et al. | |
| 2021/0299610 A1* | 9/2021 | Fukuyo | C04B 38/0009 |

* cited by examiner

HONEYCOMB BODY WITH A CUTOUT PORTION AND METHOD OF MANUFACTURING SAME

CROSS-REFERENCE TO RELATED APPLICATIONS

This application claims the benefit of priority under 35 U.S.C. § 119 of U.S. Provisional Application Ser. No. 63/248,865 filed on Sep. 27, 2021, the content of which is relied upon and incorporated herein by reference in its entirety.

FIELD

This disclosure relates to honeycomb bodies and methods of manufacturing honeycomb bodies, and more particularly to honeycomb bodies that are made in part by removing material.

BACKGROUND

Honeycomb bodies are utilized for various uses, such as catalyst-carrying substrates or particulate filters in the treatment or abatement of pollutants from a fluid stream, such as the removal of undesired components from the exhaust stream of a combustion engine of a vehicle.

SUMMARY

Disclosed herein are methods of manufacturing honeycomb bodies. In some embodiments, a method comprises forming the honeycomb body, wherein the honeycomb body comprises a matrix of intersecting walls defining a plurality of cells and channels extending longitudinally through the honeycomb body; plugging a subset of the channels to create a plurality of plugged cells in a reinforcement region of the honeycomb body; and removing material from the honeycomb body within the reinforcement region in accordance with a peripheral shape that passes through the plugged cells to form a cutout that extends an axial depth into the honeycomb body.

In some embodiments, the subset of channels comprises every channel through which the peripheral shape passes.

In some embodiments, removing the material from the honeycomb body comprises removing material from an area defined within the peripheral shape.

In some embodiments, the subset of channels comprises every channel contained within the peripheral shape.

In some embodiments, before removing material from the honeycomb body, the honeycomb body comprises at least one unplugged channel contained within the peripheral shape.

In some embodiments, the subset of channels comprises at least one channel located outside of the peripheral shape that does not have any material removed as a result of removing material from the honeycomb body.

In some embodiments, the peripheral shape is entirely bounded by the matrix of intersecting walls.

In some embodiments, the peripheral shape is partially bounded by the matrix of intersecting walls and partially intersects with an outer skin of the honeycomb body.

In some embodiments, the plurality of plugged channels comprises at least one channel radially outside of the cutout area that does not have material removed during the removing step.

In some embodiments, removing material from the honeycomb body comprises partially removing material from at least some of the plugged cells to create a skin having a continuous surface from the surfaces of partially removed plugged cells and severed ends of the intersecting walls along the peripheral shape.

In some embodiments, plugging the subset of channels comprises plugging an entire axial length of the subset of channels.

In some embodiments, plugging the subset of channels comprises plugging a depth extending from at least one end face of the honeycomb body that is at least 25% of an axial length of the honeycomb body.

In some embodiments, plugging the subset of channels comprises plugging a total depth extending from either end face of the honeycomb body that is at least 50% of an axial length of the honeycomb body.

In some embodiments, removing material from the honeycomb body comprises a machining process.

In some embodiments, the machining process comprises drilling, milling, coring, or boring into the honeycomb body.

In some embodiments, the cutout comprises a first cutout portion having a first cross-sectional geometry and extending a first axial depth into the honeycomb body from a first end face of the honeycomb body, and having a second cutout portion having a second cross-sectional geometry and extending a second axial depth into the honeycomb body from a second end face of the honeycomb body opposite to the first end face, wherein the first cross-sectional geometry is different than the second cross-sectional geometry.

In some embodiments, the first cross-sectional geometry differs from the second cross-sectional geometry in shape, dimension, or both.

In some embodiments, removing material from the honeycomb body comprises a first machining process performed on the first end face of the honeycomb body to create the first cutout portion and a second machining process performed on the second end face of the honeycomb body to create the second cutout portion.

In some embodiments, the axial depth of the cutout is less than an axial length of the honeycomb body.

In some embodiments, the axial depth of the cutout is equal to the axial length of the honeycomb body.

In some embodiments, the plugging is performed when a material of the honeycomb body is in a green state.

In some embodiments, the method further comprises shaping a mixture to form the honeycomb body from the mixture.

In some embodiments, shaping the honeycomb body comprises extruding the mixture through an extrusion die.

In some embodiments, a material of the interesting walls comprises a ceramic, a metal, or a ceramic-metal composite.

Disclosed herein are honeycomb bodies. In some embodiments, a honeycomb body comprises a matrix of intersecting walls defining a plurality of cells and channels extending longitudinally through the honeycomb body between opposing end faces; and a cutout defined by a peripheral shape in a reinforced region and extending an axial depth into the honeycomb body from at least one of the end faces; wherein the reinforcement region comprises: a plurality of partial plugged cells that together with severed ends of the intersecting walls form a skin for the cutout that extends along the peripheral shape, and a plurality of fully intact plugged cells.

In some embodiments, each of the fully intact plugged cells are adjacent to at least one of the partial plugged cells.

In some embodiments, the peripheral shape intersects with an outer periphery of the honeycomb body.

In some embodiments, the peripheral shape is fully surrounded by the matrix of intersecting walls.

In some embodiments, the partial plugged cells and the plugged cells are each plugged along an entire axial length of the honeycomb body.

In some embodiments, the partial plugged cells and the plugged cells are plugged to a depth extending from at least one end face of the honeycomb body that is at least 25% of an axial length of the honeycomb body.

In some embodiments, the partial plugged cells and the plugged cells have a total plugged depth extending from either end face of the honeycomb body that is at least 50% of an axial length of the honeycomb body.

In some embodiments, the cutout comprises a first cutout portion having a first cross-sectional geometry and extending a first axial depth into the honeycomb body from a first end face of the honeycomb body, and having a second cutout portion having a second cross-sectional geometry and extending a second axial depth into the honeycomb body from a second end face of the honeycomb body opposite to the first end face, wherein the first cross-sectional geometry is different than the second cross-sectional geometry.

In some embodiments, the first cross-sectional geometry differs from the second cross-sectional geometry in shape, dimension, or both.

In some embodiments, the axial depth of the cutout is less than an axial length of the honeycomb body.

In some embodiments, the axial depth of the cutout is equal to the axial length of the honeycomb body.

Also disclosed herein are exhaust treatment assemblies. In some embodiments, an exhaust treatment assembly comprises the honeycomb body of any of the preceding paragraphs and an auxiliary component disposed in or through the cutout.

In some embodiments, the auxiliary component establishes a connection between opposite axial sides of the honeycomb body.

In some embodiments, the connection is at least one of a mechanical, electrical, fluid, or signal connection.

In some embodiments, the assembly further comprising an upstream device and a downstream device on opposite sides of the honeycomb body connected together by the connection.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
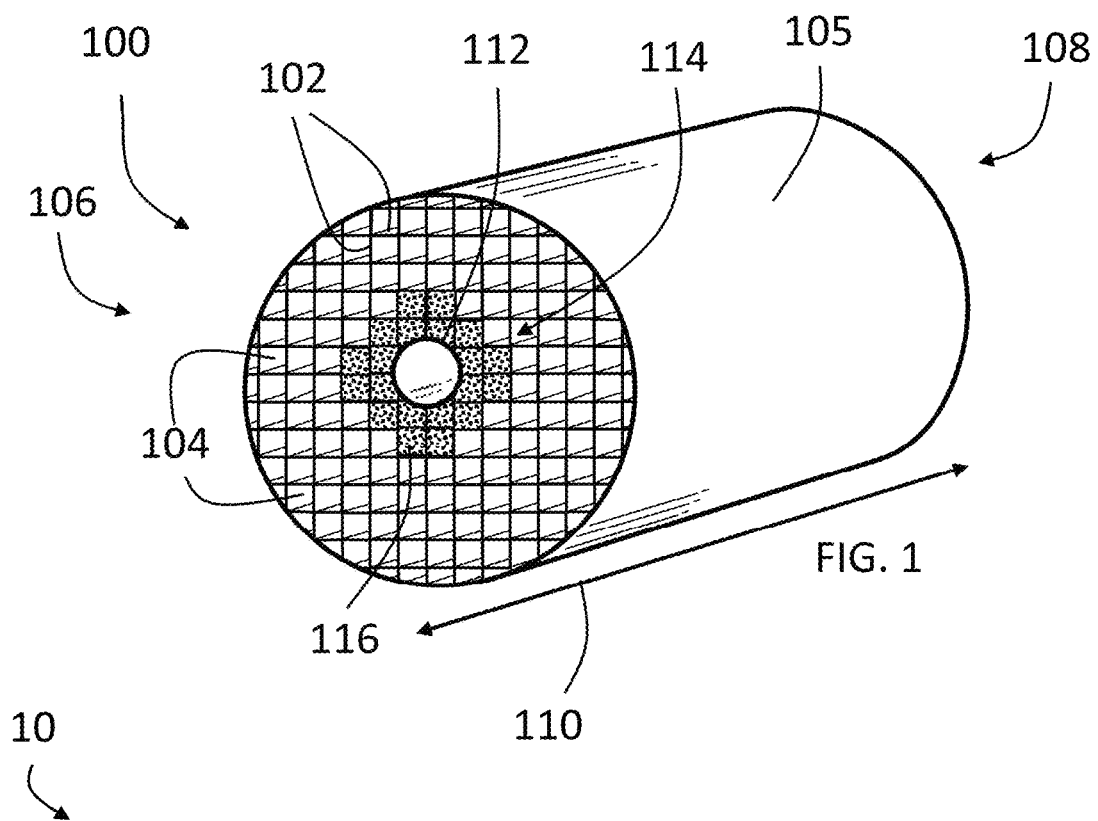
FIG. 1 is a perspective view of a honeycomb body comprising a cutout according to embodiments disclosed herein.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Modifications of the disclosure will occur to those skilled in the art and to those who make or use the disclosure. Therefore, it is understood that the embodiments shown in the drawings and described herein are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to also include the specific value or end-point referred to.

Directional terms as used herein—for example up, down, right, left, front, back, top, bottom—are made only with reference to the figures as drawn and are not intended to imply absolute orientation.

Referring to FIG. 1, a honeycomb body 100 is illustrated comprising a matrix or array of intersecting walls 102 that define a plurality of channels 104. The walls 102 and channels 104 form a honeycomb structure that is encased by a skin or outer peripheral surface 105. The channels 104 extend axially (longitudinally) through the honeycomb body 100, e.g., parallel to one another, from a first end face 106 to a second end face 108. The axial or longitudinal direction is indicated by an arrow 110 in FIG. 1. Each closed segment of the intersecting walls 102 defining one of the channels 104 may be referred to herein as a cell. In the embodiment of FIG. 1, the cells defined by the intersecting walls 102 are square-shaped (four wall segments arranged in a square), although other shapes can be used, such as triangular, hexagonal, circular, ellipsoidal, or other polygonal or geometric shape, including with or without fillets or chamfers at the corners of the cells (intersections between the walls 102). Similarly, while the shape of the honeycomb body 100 is shown in FIG. 1 as cylindrical, the honeycomb body 100 can take other shapes, such as an elliptic cylinder, or polygonal prism (e.g., having a triangular, rectangular, or other polygonal outer shape).

Figure 2:
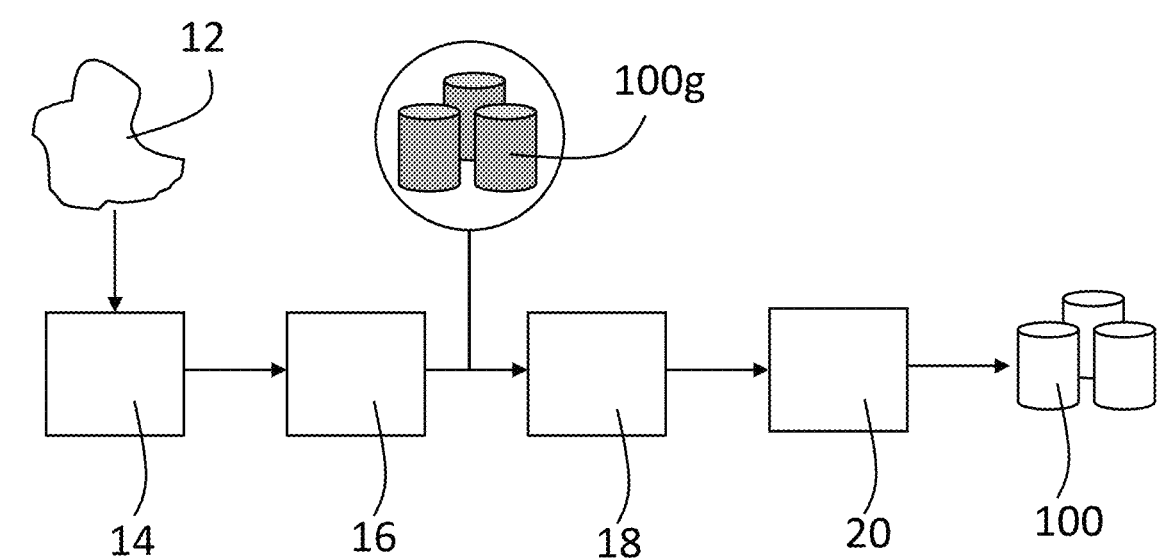
FIG. 2 schematically illustrates a system for manufacturing honeycomb bodies according to embodiments disclosed herein.

The honeycomb body 100 can be formed in any suitable manner, such as additive manufacturing, extrusion, molding, or casting. The honeycomb body 100 can be made from a ceramic, metal, or metal-ceramic composite material. For example, a manufacturing system 10 capable of forming the honeycomb bodies 100 is illustrated in FIG. 2. According to the system 10 of FIG. 2, the honeycomb bodies 100 are first formed in a green state, designated with reference numeral 100g, and are then fired to result in the honeycomb bodies 100 in their final, fired state.

According to various embodiments, organic and inorganic components are mixed together to form a green mixture 12. The green mixture 12 may be considered and/or referred to herein as a batch or batch mixture. Organic components can include pore formers (e.g., starch particles, polymer beads, resins) that provide porosity to the resulting material of the fired honeycomb bodies 100, binders (e.g., methylcellulose) that assist in maintaining the shape of the green honeycomb bodies 100g before firing, a liquid vehicle to facilitate mixing and shaping of the ingredients (e.g., water), lubricants (e.g., oils) that assist in extrusion, and/or other additives to assist in shaping, handling, formation, or properties of the honeycomb body 100 in either the green or fired states. If a ceramic material is desired for the honeycomb bodies 100, the inorganic components can include one or ceramic and/or ceramic precursor materials (e.g., alumina, silica, titania, talc, clay, etc.) that results in one or more ceramic phases in the material of the fired honeycomb bodies 100, e.g., due to reaction and/or sintering, as a result of manufacturing via the manufacturing system 10, while the inorganic components can comprise one or more metal powders (e.g., aluminum, nickel, iron, chromium, or combinations or alloys thereof) that are able to be sintered together to form a metal material for the honeycomb bodies 100. By way of example, the inorganic components can be combined as powdered materials and intimately mixed with the organic components and a liquid vehicle (e.g., water) to form a substantially homogeneous batch.

The mixture 12 can be shaped or formed into a honeycomb structure using any suitable forming means, such as molding, pressing, casting, extrusion, and the like. According to the embodiment depicted in FIG. 2, the mixture 12 is extruded using an extruder 14. For example, the extruder can comprises a honeycomb extrusion die to form the honeycomb structure (the walls 102 and channels 104) of the extrudate extruded by the extruder 14. The extrudate can be extruded with a skin (i.e., forming the skin 105) or the skin can be added in a subsequent manufacturing step. The extruder 14 can be any suitable extruder apparatus, such as a hydraulic ram extrusion press, a two stage de-airing single auger extruder, a twin screw mixer, or other.

The manufacturing system 10 can further comprise a cutting apparatus 16. For example, the cutting apparatus 16 is configured to cut the green honeycomb bodies 100g from the extrudate produced by the extruder 14. For example, the cutting apparatus can comprise a wire, laser, saw, blade, or other cutting implement used to separate lengths of the honeycomb extrudate from each other. The cutting apparatus 16 can be used to set a desired length for green honeycomb bodies 100g, and therefore the fired honeycomb bodies 100 made by firing such green bodies.

After cutting, the green honeycomb bodies can be transported to a drier 18 that removes moisture from the green bodies 100g. The dryer can utilize any suitable form of drying, such as microwave energy, convection, heat, or combination including these or other types of drying. After drying, the dry green honeycomb bodies 100g can be fired in a firing system 20. The firing system 20 comprises one or more kilns, ovens, furnaces, or other vessel capable of heating the honeycomb bodies 100 herein to the indicated temperatures (the terms "kiln", "oven", and "furnace" used interchangeably herein). As a result of firing, the ceramic, ceramic precursors, and/or metal powders react and/or sinter together to form the honeycomb bodies 100.

According to embodiments disclosed herein, the honeycomb body 100 comprises a cutout 112. For example, the cutout 112 comprises a section or portion of the honeycomb body 100 that has been removed and therefore in which the intersecting walls 102 are not present. The cutout 112 is defined by a periphery or peripheral shape (e.g., a circle shape in FIG. 1) that can be traced in the cross-sectional plane of the honeycomb body 100, and which extends into the honeycomb body 100 in the axial direction from either of the end faces 106, 108. The cutout 112 can be positioned centered along a central axis of the honeycomb body 100, or can be positioned anywhere within the end face 106, 108. The honeycomb body 100 is shown having a single cutout 112, although the honeycomb body 100 can have any number of the cutouts 112 formed therein.

In some embodiments, the cutout 112 extends through the entire axial length of the honeycomb body 100 (e.g., is arranged as a through-bore passing through the honeycomb body 100), while in some embodiments the cutout 112 extends an axial depth into the honeycomb body 100 that is less than the axial length of the honeycomb body 100. In some embodiments, the cutout 112 has a peripheral shape (including dimensions thereof) that is constant along the entire length of the cutout 112, while in some embodiments the cross-sectional shape (including dimensions thereof) of the cutout 112 changes one or more times along the axial length of the cutout 112. The cutout 112 thus results in a void, hole, hollow, cavity, bore, recess, in which there is a discontinuation in the honeycomb pattern of intersecting walls or otherwise in which the intersecting walls 102 are absent (having been removed).

The cutout 112 can be formed from any manufacturing process, such as a machining process, that is suitable to cause the removal of the material of the honeycomb body 100. For example, the cutout 112 can be formed by axial movement of a cutting tool into the honeycomb body 100 starting at one of the faces 106, 108, The axial movement of the tool can optionally be accompanied by rotation of the cutting tool, such as a drilling, milling, boring, or coring process. Alternatively and/or additionally, the machining process can comprise a vibratory, oscillatory, or reciprocal motion to assist in removal of the material of the honeycomb body 100 during formation of the cutout 112.

The cutout 112 is formed in a reinforced region of the honeycomb body 100 that provides additional strength, support, and/or stability to the honeycomb body 100 during the removal process (e.g., machining process) used to form the cutout 112. For example, as shown in FIG. 1, the cutout 112 is located within a reinforced region 114 that comprises a plurality of plugged cells 116. The plugged cells 116 are formed by plugging a subset of the channels 104. For example, in some embodiments the subset of channels 104 that are plugged to form the plugged cells 116 is selected as at least those channels 104 through which the peripheral shape of the cutout 112 can be traced.

Figure 3:
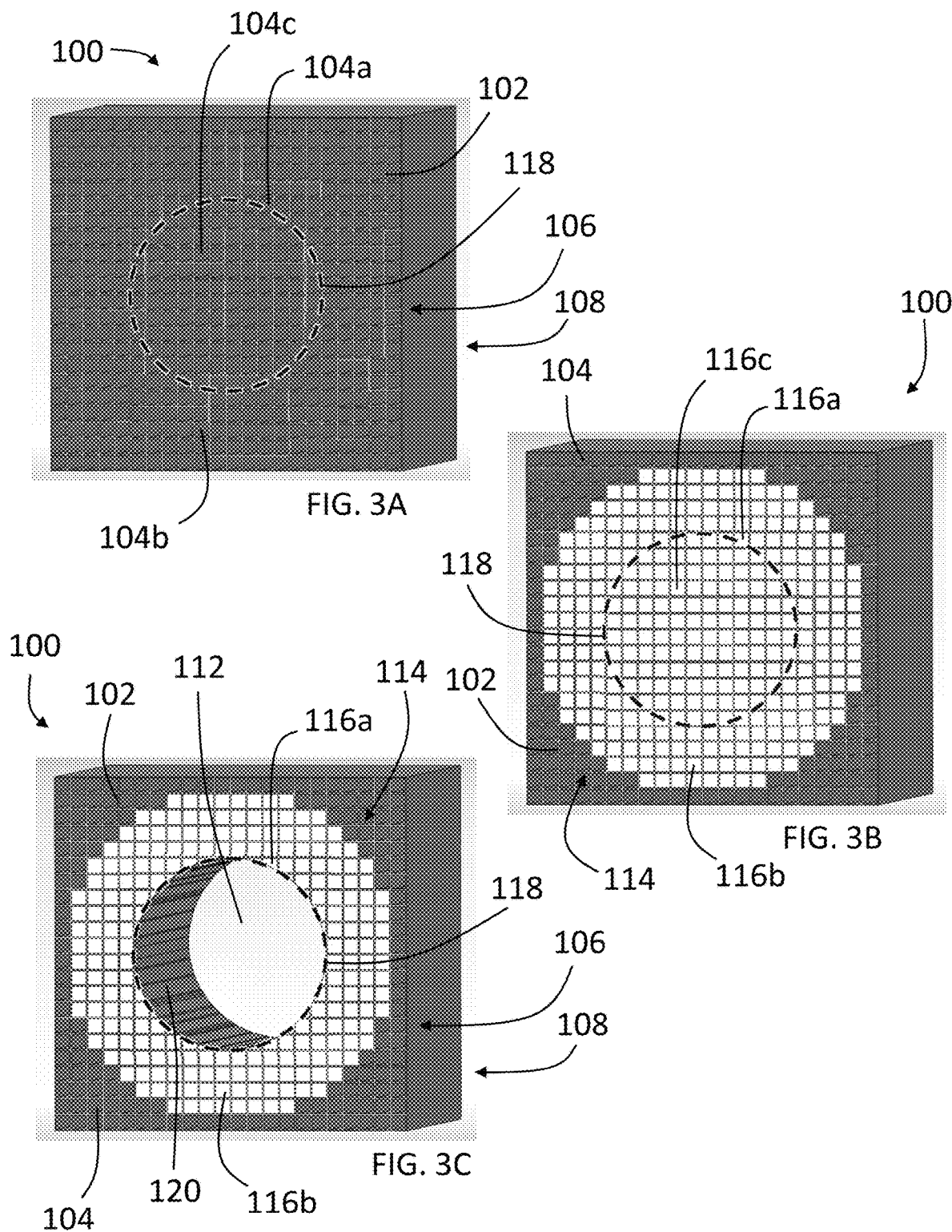
FIGS. 3A-3C are perspective views illustrating a honeycomb body at various stages of a method of manufacturing the honeycomb body with a cutout according to embodiments disclosed herein.

For example, various steps of a method for forming the cutout 112 is shown in FIGS. 3A-3C. As noted above, the honeycomb body 100 can have any size or shape, therefore the square-shaped honeycomb body shown in FIGS. 3A-3C can be an example of the full shape for the honeycomb body 100 or just a relevant portion of a larger honeycomb structure. As noted above, the honeycomb body 100 is first created by any suitable process (such as via the manufacturing system 10). FIG. 3A illustrates an example of the honeycomb body 100 (or relevant portion thereof) when the channels 104 of the honeycomb body 100 are all open and unplugged. Generally, as shown in FIG. 3B, a subset of the initially open channels 104 are plugged to create the plugged cells 116. Next, as shown in FIG. 3C, the material of the honeycomb body 100 (e.g., the material of the intersecting walls 102 and the material of the plugged cells 116) is removed in accordance with the peripheral shape 118 (e.g., all material inside of the peripheral shape 118 is removed from the honeycomb body 100 down to an axial depth into the end face 106, 108) to create the cutout 112.

The location for the cutout 112 can first be identified from a peripheral shape 118 (the cross-sectional shape) for the cutout 112 traced onto one of the end faces 106, 108 of the honeycomb body 100, as shown in FIG. 3A. Next a subset of the channels 104 corresponding to the peripheral shape 118 can be plugged, which creates the plugged cells 116 in the reinforced region 114 as shown in FIG. 3B. For example, the subset of channels 104 that are plugged to form the plugged cells 116 can comprise at least those channels 104 through which the peripheral shape 118 intended for the cutout 112 passes. For example, in FIG. 3A, a particular one of the channels 104 through which the peripheral shape 118 passes is identified with reference numeral 104a, and by comparison to FIGS. 3B-3C, it can be seen that the channel 104a becomes a plugged cell 116a after plugging.

In the example of FIGS. 3A-3C, the subset of channels 104 that were plugged to create the plugged cells 116 also comprises a plurality of the channels 104 outside of the peripheral shape 118. Accordingly, the plugged cells 116 that are located outside of the peripheral shape 118 do not have any material removed during formation of the cutout 112. For example, in FIG. 3A, a particular one of the channels 104 outside of the peripheral shape 118 is identified with reference numeral 104b, which channel 104b becomes the plugged cell 116b, shown in FIGS. 3B-3C, after plugging. The plugged cells 116 located outside of the peripheral shape 118 can be adjacent to one or more other plugged cells 116, e.g., starting from those channels 104 through which the peripheral shape 118 passes and moving outward to any number of successive plugged cells 116.

In the example of FIGS. 3A-3C, the subset of channels 104 that were plugged to create the plugged cells 116 also comprise a plurality of the channel 104 located within the peripheral shape 118. For example, in FIG. 3A, a particular one of the channels 104 located within the peripheral shape 118 is identified with reference numeral 104c, which channel 104c becomes the plugged cell 116c, shown in FIG. 3B, after plugging, and which is part of the material removed to form the cutout 112, and therefore no longer present in FIG. 3C. The plugged cells 116 located within the peripheral shape 118 can be adjacent to one or more other plugged cells 116, e.g., starting from those channels 104 through which the peripheral shape 118 passes and moving inward to any number of successive plugged cells 116. In some embodiments, every channel 104 located within the peripheral shape 118 for the cutout 112 is plugged to become one of the plugged cells 116 (such as shown in FIG. 3B). In some embodiments, one or more channels 104 within the peripheral shape 118 are not plugged. In some embodiments, there are a plurality of unplugged channels 104 and plugged cells 116 located within the peripheral shape 118. In some embodiments, only those channels 104 through which the peripheral shape 118 passes are plugged, such that there are no additional plugged cells 116 located within the peripheral shape 118.

It can be seen from FIG. 3C that the plugged cell 116a (and all other plugged cells 116 through which the peripheral shape 118 passes) are partially removed as a result of the material removal process. Accordingly, the partially removed plugged cells (e.g., the plugged cell 116a) may be referred to as partial cells. In contrast, since the plugged cell 116b is located outside of the removal area designated by the peripheral shape 118, the plugged cell 116b is maintained fully intact even after the cutout 112 is formed. Additionally, it can be seen that the plugged cell 116c, located within the removal area designed by the peripheral shape 118 in FIG. 3B, is removed during formation of the cutout 112, and therefore no longer present in FIG. 3C.

As noted herein, the extra material of the plugged cells 116 provides additional strength, stability, and/or support to the honeycomb body 100 during the material removal process, e.g., thereby preventing undesirable damage to the honeycomb body 100, such as breakage, cracking, or shattering of the walls 102 that are not intended to be removed. Additionally, after removal of the material to form the cutout 112 (e.g., FIG. 3C), the remaining plugged cells 116 in the reinforcement region 114 effectively form a skin, border, or boundary for the cutout 112, which continuous to provide support, strength, and stability to the honeycomb body 100 after the cutout 112 is formed. For example, without the reinforcement provided by the remaining plugged cells 116, the cutout 112 may present a weak spot for the honeycomb body 100 that might excessively reduce a structural characteristic of property of the honeycomb body 100, such as its isostatic strength. Additionally, the remaining portions of the partial plugged cells 116 (e.g., the plugged cell 116a, which is partially removed to form the cutout 112) also advantageously create a skin 120. Without the plugged cells 116 positioned along the peripheral shape 118 of the cutout 112, the periphery of the cutout would be defined by the ragged, shattered ends of the walls 102, and not a substantially smooth, solid, and/or continuous surface. Thus, the plugged cells 116 advantageously span the areas between the severed ends of the walls 102 such that the surface of the skin 120 is created from the surfaces of the partial plugged cells 116 interspersed with the severed ends of the walls 102 (which can be seen as striated lines in FIG. 3C), which together create the skin 120 with or as a substantially solid, smooth, and/or continuous surface.

Any suitable plugging process and mixture known or discovered in the ceramic honeycomb manufacturing arts can be utilized to plug the channels 104 to create the plugged channels 116. For example, the plugged cells 116 can be formed by filling the selected subset of channels 104 with a plugging mixture, such as a cement. The plugging material can be injected, pressed, or otherwise permitted or forced to flow into the designated channels 104. In some embodiments, the channels 104 that are intended to remain open (and thus do not form the plugged cells 116) are covered, such as with a mask, to prevent the plugging mixture to enter those channels. For example, after covering (e.g., masking), the honeycomb body 100 can be submersed in a plugging mixture so that the unmasked channels are filled with the plugging mixture and become the plugged cells 116. In some embodiments, the honeycomb body 100 is positioned relative to a chamber of the approximate size of the reinforcement region 114, and a plugging material in the chamber is pressurized, e.g., via a piston, to force the plugging material into those channels 104 aligned with the chamber. In some embodiments, one end of the selected subset of channels intended to be plugged is blocked, covered, or masked, and a plugging mixture is injected into those channels in order to fill those channels with the plugging mixture.

The plugging mixture can comprise any suitable plugging mixture, such as one or more inorganic filler materials compatible with the material of the walls 102. For example, in embodiments in which the walls 102 comprise a ceramic material, the plugging mixture can comprise one or more ceramic or ceramic precursor materials, e.g., alumina, silica, cordierite, aluminum titanate, mullite, or other ceramic or ceramic precursor particles, carried by a liquid carrier, such as water. In embodiments in which the walls 102 comprise a metal material (or metal-ceramic composite material), the plugging mixture can comprise one or more metal particles. In some embodiments, the inorganic filler material in the plugging mixture comprises particles of one or more of the ceramic phases of the material of the intersecting walls 102, one or more precursors of the ceramic phases of the material of the intersecting walls 102, or one or more metal particles of a metal alloy or composite material of the intersecting walls 102. Before removing material to form the cutout 112, the plugging mixture can be permitted to cure or harden, such as by drying. In some embodiments, the curing process is assisted by the application of energy (e.g., microwave or radiofrequency energy), heat (e.g., heated air, hot plate or other radiative heater), convection (e.g., a flow of air), or combinations thereof.

While reference to the honeycomb body 100 herein typically refers to the honeycomb body 100 in its final form (e.g., after it has been fired and therefore the material of the walls 102 is reacted and/or sintered into a monolithic structure), the general description of the honeycomb body 100 and the process steps described herein are also applicable to the honeycomb body 100 when in the green state (see green state 100g with respect to FIG. 2). For example, the plugging process described with respect to FIG. 3B can occur when the honeycomb body 100 is in the green state. After plugging in the green state, the honeycomb bodies 100 can be fully fired, or alternatively dried or cured at a temperature that is less than a firing temperature. Accordingly, the removal process of FIG. 3C can occur in the green state, e.g., after drying or curing, but before firing. Alternatively, the plugging (FIG. 3B) can occur when the honeycomb bodies 100 are green and then fired (together with the plugged cells 116) before the removal process is finally performed on the fired bodies.

As described herein, the extra material of the plugged cells 116 advantageously facilitates the process of forming the cutout 112, such as by providing strength, support, and/or stability to the honeycomb body 100 during a machining process used to form the cutout 112. For example, without the reinforced region 114, the intersecting walls 102 (including the intersecting walls 102 in areas outside of where the cutout 112 is to be formed), may suffer an increased likelihood of cracking, breaking, shattering, or otherwise being damaged by the forces exerted on the honeycomb body 100 during the machining process used to form the cutout 112.

Additionally, by forming the cutout 112 at the reinforcement region 114 (with the peripheral shape 118 for the cutout 112 passing through the plugged cells 116), the cutout 112 is advantageously formed naturally comprising a "skin", e.g., the skin 120. That is, the plugging material in the remaining portions of the plugged cells 116 (the portions that are not removed during formation of the cutout 112), forms the skin 120 without any need for subsequent steps (such as the application of a cement or other skin-forming material after the material removal process). Additionally, since the cutout 112 is formed through the plugged cells 116 in the reinforced area 114, the skin 120 can be formed with or as a substantially solid, smooth, and/or continuous surface.

As described herein, the honeycomb body 100 can be utilized in a variety of applications, such as for use in a catalytic converter (e.g., the walls 102 acting as a substrate to be loaded with a catalytic material) and/or as a particulate filter (e.g., in which the ends of some of the channels 104 are plugged to trap particulate within the channels 104). Such honeycomb bodies 100 can thus assist in the treatment or abatement of pollutants from a fluid stream, such as the removal of undesired components from the exhaust stream of a combustion engine of a vehicle. For example, the material of the walls 102 can be loaded with a catalytic material such as a three-way catalyst to treat one more compounds in a fluid flow (e.g., engine exhaust) through the channels 104 of the honeycomb body 100.

Some of the channels 104 of the honeycomb body 100 can be plugged to arrange the honeycomb body 100 as a particulate filter. Plugging can be performed using any suitable plugging process (e.g., patty plugging, slurry plugging, etc.) and plugging material (e.g., a cold set plugging cement). In some embodiments, some of the channels 104 are plugged at the first end 106, while some of the channels 104 not plugged at the first end 106 are plugged at the second end 108. Any suitable plugging pattern can be used. For example, alternating ones of the channels 104 can be plugged at the opposite ends 106, 108. In contrast to the plugged cells 116, channels that are plugged to arrange the honeycomb body 100 as a filter may only be plugged to an axial depth of a few millimeters, e.g., less than 10%, or even less than 5%, of the axial length of the honeycomb body 100.

Figure 4:
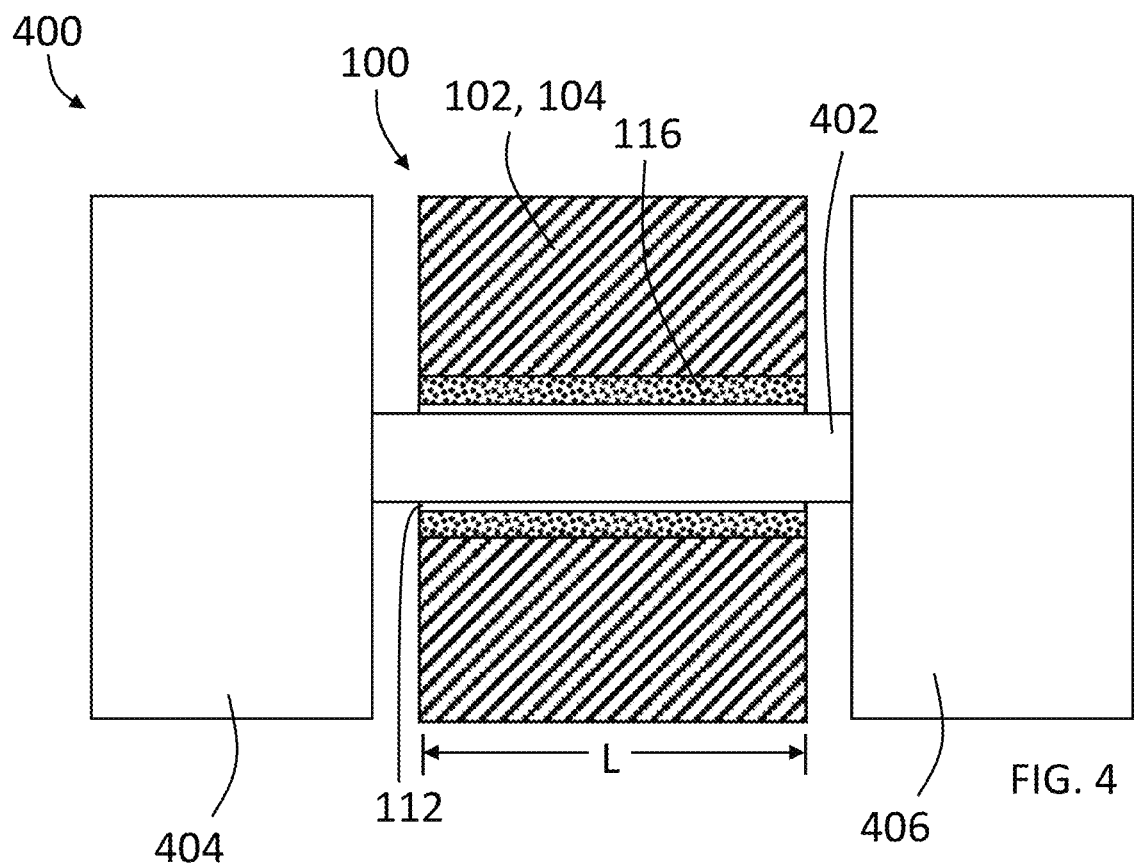
FIG. 4 is a cross-sectional view schematically illustrating an exhaust treatment assembly according to embodiments disclosed herein.

In the embodiment of FIG. 4, an assembly 400 for an exhaust aftertreatment system (e.g., installed downstream of an engine in an exhaust line, such as an automobile exhaust line) is illustrated that comprises an example of the honeycomb body 100 in which the cutout 112 extends through an entire axial length L of the honeycomb body 100. Accordingly, the cutout 112 provides a passage through which an auxiliary component 402 can be passed in order to provide a connection between an upstream device 404 and a downstream device 406 located on opposite axial sides of the honeycomb body 100. For example, the auxiliary component 402 can be a rod, bar, arm, tube, conduit, wire, cable, line, or other component that provides a mechanical, electrical, signal, fluid, or other connection, and/or combinations thereof, between the upstream device 404 and the downstream device 406. For example, one or both of the upstream device 404 and 406 can comprise a valve, a baffle or flow diverter, a heating element, a sensor, an additive (e.g., urea) dispenser, a controller, or other component that would benefit from some form of connection through the honeycomb body 100. For example, the assembly 400 may be advantageous to save space while enabling connections between components on upstream and downstream sides of a honeycomb body, and/or to facilitate the components of the assembly 400 to be efficiently coupled or packaged together.

Figure 5:
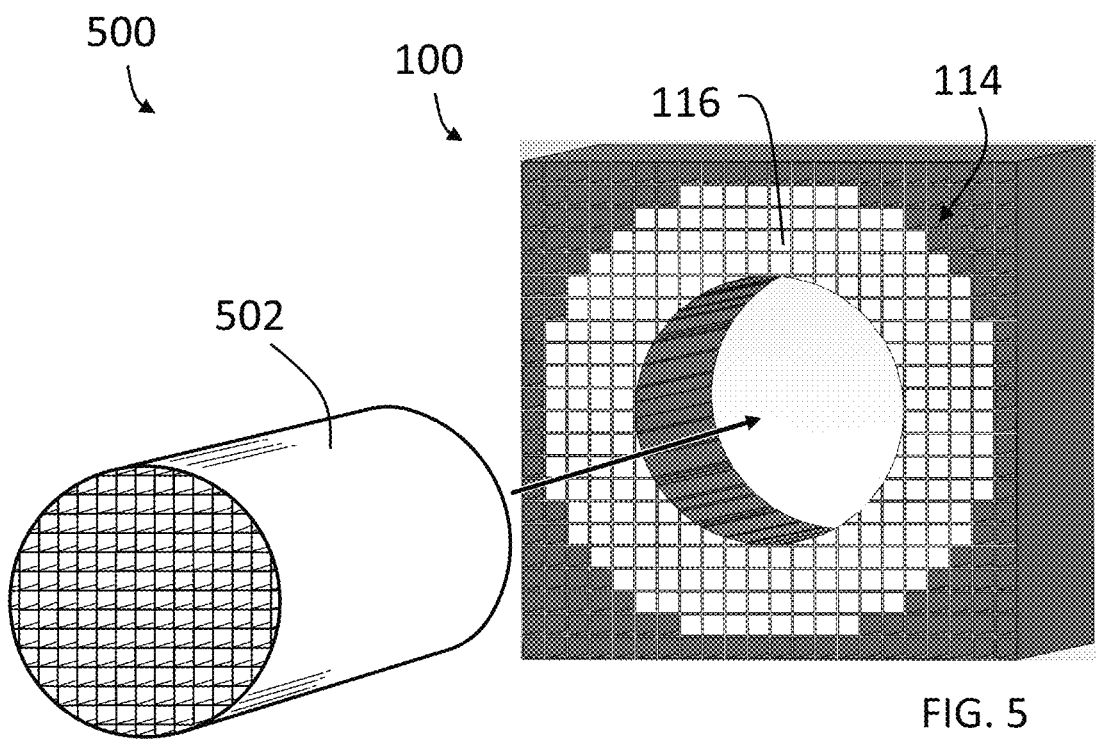
FIG. 5 is a perspective exploded view of a composite honeycomb body assembly according to embodiments disclosed herein.

FIG. 5 illustrates an assembly 500 in which a secondary honeycomb body 502 (e.g., comprising its own matrix or array of intersecting walls that define channels extending therethrough) is inserted into the cutout 112 of the honeycomb body 100. For example, the secondary honeycomb body 502 can differ in some manner from the honeycomb body 100, thereby forming a composite honeycomb body having different properties at the locations corresponding to each of the different honeycomb bodies. For example, the secondary honeycomb body 502 can have a chemical composition, material, wall thickness, number of cells per square inch (cpsi), porosity, median pore size, open frontal area, electrical or thermal conductivity, cell shape, or other property or characteristic that differs from that of the honeycomb body 100.

Figure 6:
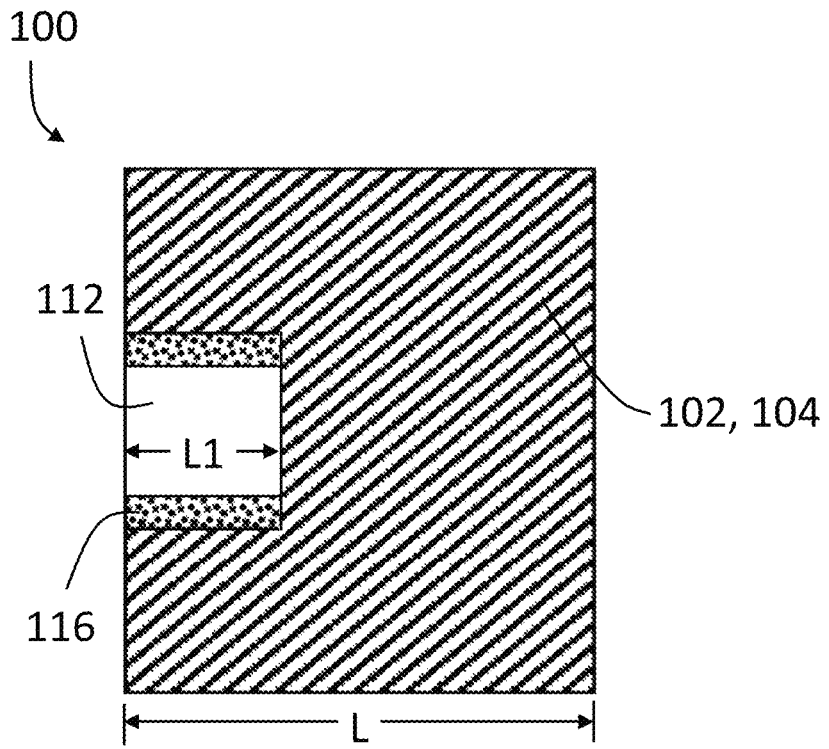
FIG. 6 is a cross-sectional view schematically illustrating a honeycomb body comprising a cutout extending a depth less than an axial length of the honeycomb body according to embodiments disclosed herein.

In some embodiments, the cutout 112 does not extend through the entire axial length of the honeycomb body 100. For example, FIG. 6 illustrates an embodiment in which the cutout 112 has an axial depth L1 that is less than the axial length L of the honeycomb body 100. The embodiment of FIG. 6 may be advantageous, for example, to arrange the cutout 112 as a recess configured (e.g., shaped and sized) to receive a component, such as a sensor, mechanical support, heater, electrical device, controller, or other, and thereby embed the component into the honeycomb body. The plugged cells 116 can be plugged along the entire axial length of the honeycomb body 100, or only to approximately the axial depth L1 of the cutout 112.

Figure 7:
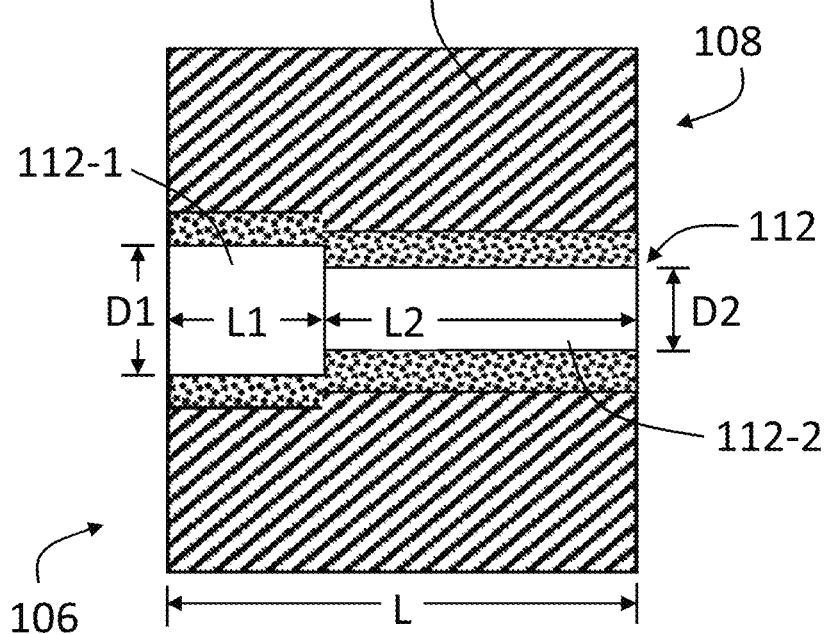
FIG. 7 is a cross-sectional view schematically illustrating a honeycomb body comprising a cutout comprising multiple cutout portions that have different cross-sectional geometries according to embodiments disclosed herein.

In some embodiments, the cutout 112 has multiple different shapes or sizes at different axial locations within the honeycomb body 100. For example, FIG. 7 illustrates an embodiment in which the cutout 112 comprises a first cutout portion 112-1 having first dimension D1 (e.g., width) extending into the honeycomb body 100 from the first end face 106 a first axial depth L1, and a second cutout portion 112-2 comprising a second dimension D2 (in this case, smaller than the first dimension D1) extending into the honeycomb body 100 from the second end face 108 a second axial depth L2. For example, the first cutout portion 112-1 can be formed from a first removal process (e.g., machining process, such as drilling) to the first depth L1 into the first end face 106 and the second cutout portion 112-2 can be formed from a second removal process (e.g., drilling) to a second depth L2 into the second face 108. Due to the different sizes of the cutout portions 112-1 and 112-2, the plugged cells 116 can correspond to different subsets of the channels 104 that are respectively plugged to the first depth L1 from the first end face 106 and to the second depth L2 from the opposite end face 108. Similarly to the different dimensions, the first and second cutout portions 112-1 and 112-2 can have different shapes.

Figure 8:
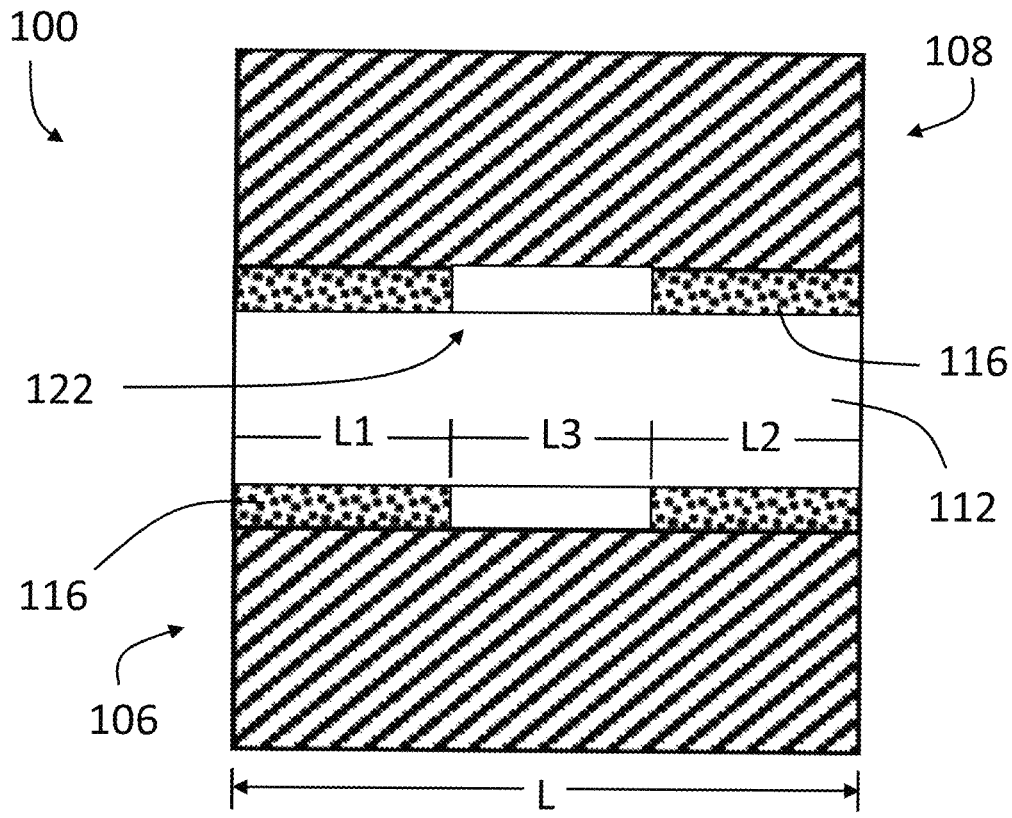
FIG. 8 is a cross-sectional view schematically illustrating a honeycomb body comprising a cutout bounded by plugged cells over at least a portion of an axial length of the honeycomb body and by an unplugged region along at least another portion of the axial length according to embodiments disclosed herein.

In some embodiments, the plugged cells 116 are not plugged along the entire axial depth or length of the cutout 112. For example, FIG. 8 illustrates an embodiment in which the plugged cells 116 are plugged along a first axial depth L1 from the first end face 106, and a second axial depth L2 along a second axial depth L2 from the second end face 108, but which have an unplugged region 122 that extends along an unplugged length L3. For example, the unplugged length L3 may be desired in embodiments where the axial length L is particularly long, thereby increasing the complexity of plugging the entire length, or to accommodate for some degree of voids (e.g., air gaps) that may naturally result from the plugging or plug curing process. In some embodiments, the plugged cells 116 are only plugged an axial depth starting from the end face at which the material removal process is initiated (e.g., the end face into which a drill or other cutting tool is first engaged), but not further along the channels 104 (e.g., plugged along the first axial depth L1 but would be unplugged for the length L3 and also unplugged for the second axial depth L2). In some embodiments, the plugged depth of the plugged cells 116 (e.g., the distance of the first axial depth L1) into either or both end faces is at least 25% of the axial length L of the honeycomb body 100. In some embodiments, the total plugged length of the plugged cells 116 (i.e., the sum of the first axial depth L1 and the second axial depth L2) is at least 50%, at least 75%, at least 80%, at least 90%, or even at least 95% of the axial length L of the honeycomb body 100.

Figure 9:
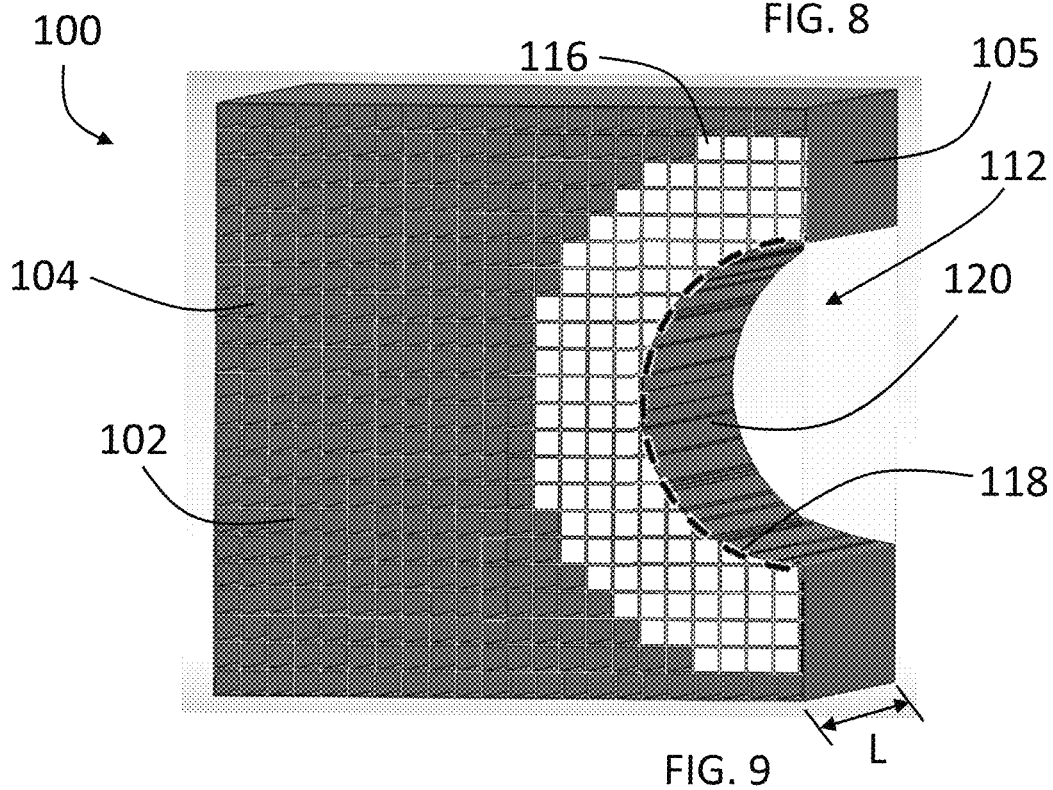
FIG. 9 is a perspective view illustrating a honeycomb body comprising a cutout that intersects with an outer periphery of the honeycomb body according to embodiments disclosed herein.

In some embodiments, the cutout 112 is not completely surrounded by the matrix of the intersecting walls 102. In other words, in some embodiments, the cutout 112 intersects with the outer skin 105 of the honeycomb body 100. For example, FIG. 9 illustrates an embodiment in which the peripheral shape 118 of the cutout 112 is an arc (e.g., semi-circle) that intersects with the outer skin 105 of the honeycomb body 100. Other than intersecting with the outer skin 105, the peripheral shape 118 of the cutout 112 can be utilized as described herein to determine a subset of the channels 104 to be plugged to form the plugged cells 116 to form the reinforcement region 114 as a skin, boundary, or border to reinforce the honeycomb body 100 at the cutout 112.

In some embodiments, instead of removing the material within the peripheral shape 118, the material within the peripheral shape 118 is maintained and the material outside of the peripheral shape 118 is removed. For example, instead of forming the honeycomb body 100 with the outer skin 105 or otherwise applying a material to a matrix of the intersecting walls 102 to create the outer skin 105, the outer skin 105 can be created similarly to the skin 120. For example, in some embodiments, the peripheral shape 118 corresponds to the desired outer dimensions for the honeycomb body, and accordingly the subset of channels 104 to be plugged are selected as a ring of channels through which the peripheral shape 118 passes (e.g., and optionally additional adjacent channels for additional support). By pressing a ring-shaped punch or similar tool to cut through the plugged cells 116 along the peripheral shape 118, the honeycomb body 100 can be formed from the within the ring-shaped punch, with the material outside of the ring-shaped punch being removed. Similar to the skin 120, the plugged cells 116 in this embodiment would form the outer skin 105.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A method of manufacturing a honeycomb body, the method comprising:

forming the honeycomb body, wherein the honeycomb body comprises a matrix of intersecting walls defining a plurality of cells and channels extending longitudinally through the honeycomb body;

plugging a subset of the channels at a first end face of the honeycomb body to create a plurality of plugged cells in a reinforcement region of the honeycomb body at the first end face; and removing material from the honeycomb body within the reinforcement region in accordance with a peripheral shape that passes through the plugged cells to form a cutout that extends an axial depth into the honeycomb body;

wherein the subset of channels comprises every channel through which the peripheral shape passes, and wherein removing the material from the honeycomb body comprises removing material from an area defined within the peripheral shape.

2. The method of claim 1, wherein the subset of channels comprises every channel contained within the peripheral shape.

3. The method of claim 1, wherein the subset of channels comprises at least one channel located outside of the peripheral shape that does not have any material removed as a result of removing material from the honeycomb body.

4. The method of claim 1, wherein the peripheral shape is entirely bounded by the matrix of intersecting walls.

5. The method of claim 1, wherein the peripheral shape is partially bounded by the matrix of intersecting walls and partially intersects with an outer skin of the honeycomb body.

6. The method of claim 1, wherein removing material from the honeycomb body comprises partially removing material from at least some of the plugged cells to create a skin having a continuous surface from the surfaces of partially removed plugged cells and severed ends of the intersecting walls along the peripheral shape.

7. The method of claim 1, wherein plugging the subset of channels comprises plugging an entire axial length of the subset of channels.

8. The method of claim 1, wherein plugging the subset of channels comprises plugging a depth extending from at least one end face of the honeycomb body that is at least 25% of an axial length of the honeycomb body.

9. The method of claim 1, wherein the axial depth of the cutout is less than an axial length of the honeycomb body.

10. The method of claim 1, wherein the axial depth of the cutout is equal to the axial length of the honeycomb body.

11. The method of claim 1, wherein the plugging is performed when a material of the honeycomb body is in a green state.

12. A method of manufacturing a honeycomb body, the method comprising:

forming the honeycomb body, wherein the honeycomb body comprises a matrix of intersecting walls defining a plurality of cells and channels extending longitudinally through the honeycomb body;

plugging a subset of the channels at a first end face of the honeycomb body to create a plurality of plugged cells in a reinforcement region of the honeycomb body at the first end face; and removing material from the honeycomb body within the reinforcement region in accordance with a peripheral shape that passes through the plugged cells to form a cutout that extends an axial depth into the honeycomb body;

wherein the subset of channels comprises every channel through which the peripheral shape passes, and wherein the cutout comprises a first cutout portion having a first cross-sectional geometry and extending a first axial depth into the honeycomb body from the first end face of the honeycomb body, and having a second cutout portion having a second cross-sectional geometry and extending a second axial depth into the honeycomb body from a second end face of the honeycomb body opposite to the first end face, wherein the first cross-sectional geometry is different than the second cross-sectional geometry.

13. The method of claim 12, wherein the first cross-sectional geometry differs from the second cross-sectional geometry in shape, dimension, or both.

* * * * *